United States Patent
Tong et al.

(10) Patent No.: US 9,836,449 B2
(45) Date of Patent: Dec. 5, 2017

(54) INFORMATION ANALYSIS SYSTEM

(71) Applicant: Hitachi, Ltd., Tokyo (JP)

(72) Inventors: Bin Tong, Tokyo (JP); Hiroaki Ozaki, Tokyo (JP); Makoto Iwayama, Tokyo (JP); Yoshiyuki Kobayashi, Tokyo (JP); Ravigopal Vennelakanti, Brisbane, CA (US); Anshuman Sahu, Brisbane, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/855,517

(22) Filed: Sep. 16, 2015

(65) Prior Publication Data

US 2017/0075872 A1   Mar. 16, 2017

(51) Int. Cl.

| | |
|---|---|
| *G06F 17/27* | (2006.01) |
| *E21B 47/00* | (2012.01) |
| *G06F 17/21* | (2006.01) |
| *G10L 15/00* | (2013.01) |
| *G10L 21/00* | (2013.01) |
| *G06G 7/48* | (2006.01) |
| *G06G 7/50* | (2006.01) |
| *G06F 7/60* | (2006.01) |
| *G06Q 30/00* | (2012.01) |
| *G06Q 40/00* | (2012.01) |
| *G01V 1/28* | (2006.01) |
| *G06F 17/30* | (2006.01) |
| *C40B 20/00* | (2006.01) |

(52) U.S. Cl.
CPC .......... *G06F 17/2765* (2013.01); *E21B 47/00* (2013.01)

(58) Field of Classification Search
USPC ...... 704/9, 10, 257, 251, 277, 275; 707/754; 702/14; 506/2; 705/26.7, 37; 703/2, 9, 703/10
See application file for complete search history.

(56) References Cited

U.S. PATENT DOCUMENTS

2010/0121623 A1\* 5/2010 Yogeswaren .......... G01V 11/00
703/2
2012/0136641 A1\* 5/2012 Fung ....................... E21B 43/00
703/10

(Continued)

FOREIGN PATENT DOCUMENTS

WO   2011/077300 A2   6/2011

*Primary Examiner* — Neeraj Sharma
(74) *Attorney, Agent, or Firm* — Mattingly & Malur, PC

(57) ABSTRACT

The problem solved by this invention is to convert text information in a geology report to numerical values which reflects geological characteristics of a well's subsurface. Prior art referred above cannot be applicable to this problem. Since text information in the geology report is in the natural language form. This information is not widely used in this industry, due to the fact that the text information can be hardly extracted and summarized into numerical values and integrated into current physical geology models or statistical models. This invention makes the text information in geology report, which is often in a natural language form, easier to be integrated into current geology physical models or statistical models. Also, the numerical values extracted from the geology report can be integrated with other kinds of data, such as seismic data and well-logging data, to obtain more accurate and comprehensive analysis results.

20 Claims, 18 Drawing Sheets

(56) References Cited

U.S. PATENT DOCUMENTS

| | | | |
|---|---|---|---|
| 2015/0149139 A1* | 5/2015 | Chavez | E21B 43/00 703/10 |
| 2015/0284811 A1* | 10/2015 | Knight | E21B 47/1015 506/2 |
| 2016/0092482 A1* | 3/2016 | Haq | G06Q 10/06 707/754 |
| 2016/0161635 A1* | 6/2016 | Ramsay | G01V 99/005 703/9 |
| 2016/0180437 A1* | 6/2016 | Boston | G06Q 30/0631 705/26.7 |
| 2016/0196367 A1* | 7/2016 | Petukhov | E21B 43/26 703/2 |
| 2016/0222765 A1* | 8/2016 | Nooruddin | E21B 41/0092 |
| 2017/0023066 A1* | 1/2017 | Kirkhope | F16C 43/04 |
| 2017/0051582 A1* | 2/2017 | Pabon | E21B 43/26 |

\* cited by examiner

[FIG. 1]
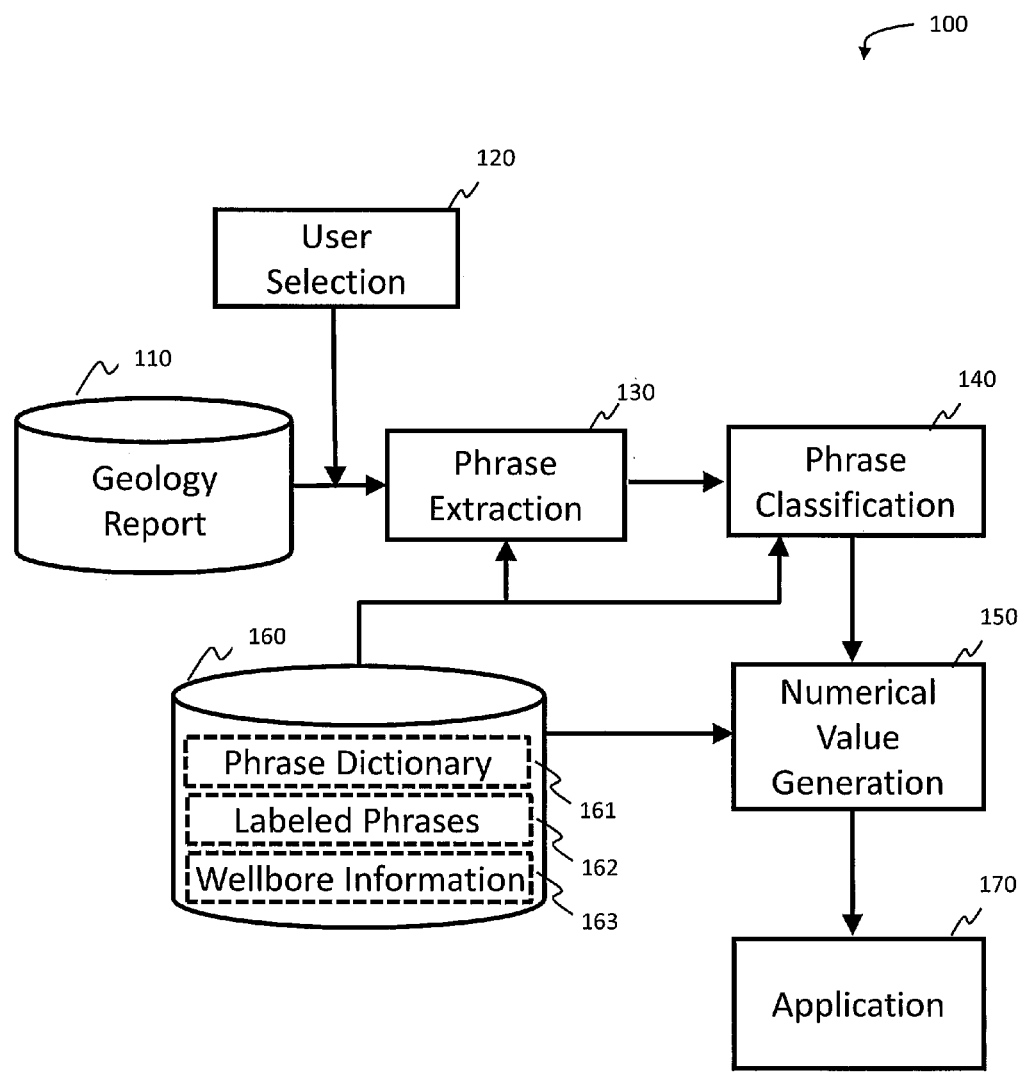

| Dictionary Type | Keywords |
|---|---|
| Rock color | Red, Brown, White, Green, Grey,... |
| Oil stain | Odor, Show, Staining, Stain,.... |
| Porosity | Porosity, ... |
| Cut | Cut,... |
| ... | .... |

210  220

230  240

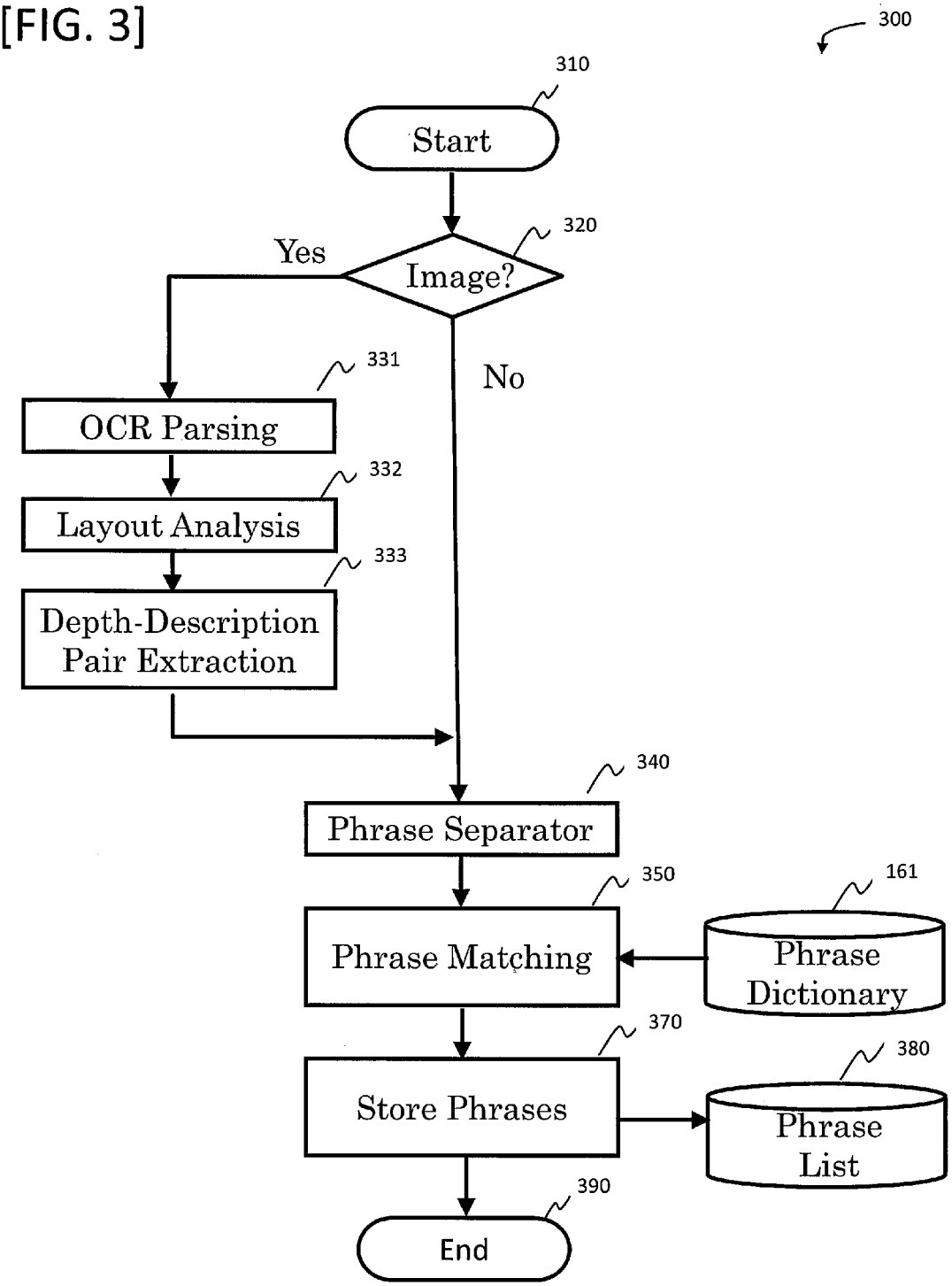
[FIG. 3]

| Depth Range | Rock-color Phrases |
|---|---|
| 8000-8030 | cream tan, light tan to tan, cream gray, ... |
| 8030-8060 | off white, medium gray, ... |
| 8060-8090 | light brown,... |
| 8090-8120 | cream tan, light tan to tan, cream gray, ... |
| 8120-8150 | light brown, cream gray, ... |
| 8150-8180 | light to medium brown, brown, light gray, ... |
| ... | .... |

[FIG. 4(B)]

| Depth Range | Oil-stain Phrases |
|---|---|
| 8000-8030 | live oil stain,.. |
| 8030-8060 | moderate oil odor,... |
| 8060-8090 | no oil stain,... |
| 8090-8120 | dead oil stain,... |
| 8120-8150 | strong petro odor,... |
| 8150-8180 | light oil stain,... |
| ... | .... |

[FIG. 5]
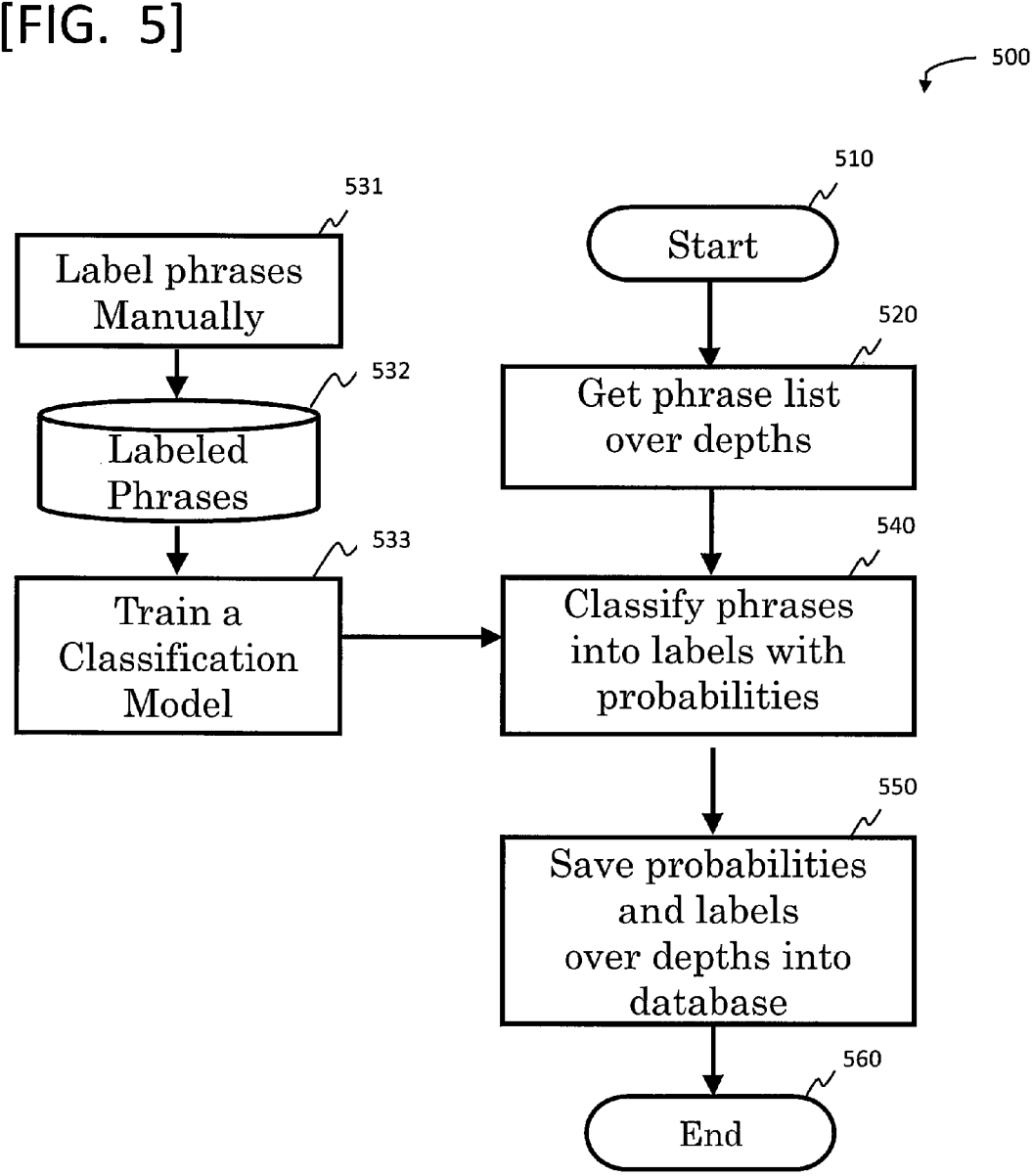

[FIG. 6]
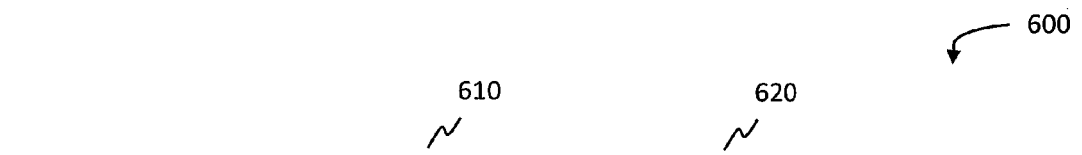

[FIG. 7]

| Depth Range | PT | WP | WN | NG | Label |
|---|---|---|---|---|---|
| 8000-8030 | 0.7 | 0.2 | 0.1 | 0 | PT |
| 8030-8060 | 0.4 | 0.6 | 0 | 0 | WP |
| 8060-8090 | 0.2 | 0 | 0.8 | 0 | WN |
| 8090-8120 | ... | ... | ... | ... | ... |
| 8120-8150 | ... | ... | ... | ... | ... |
| 8150-8180 | ... | ... | ... | ... | ... |
| ... | ... | ... | ... | ... | ... |

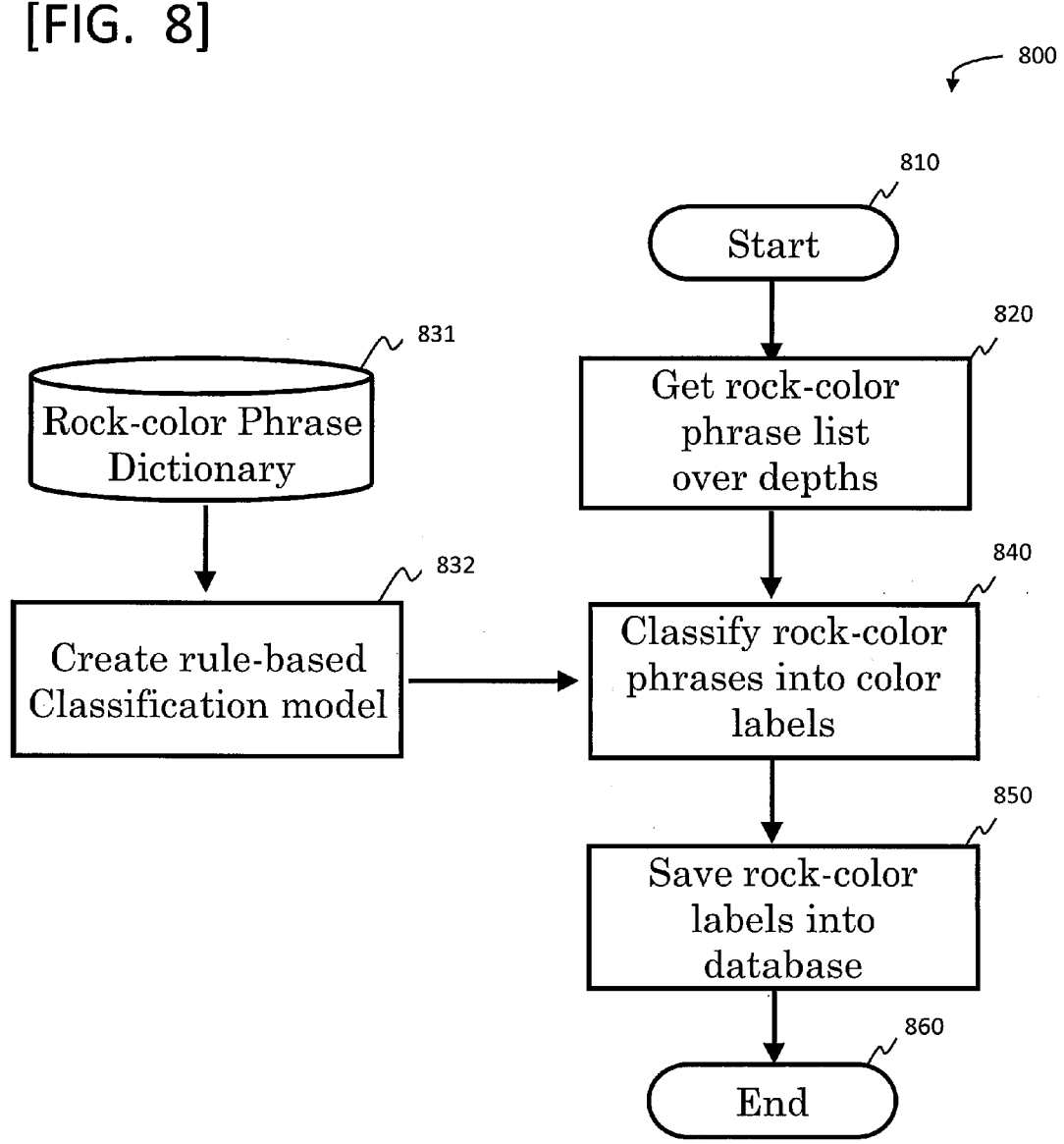
[FIG. 8]

[FIG. 9]

| Depth | Rock-color Classes |
|---|---|
| 8000-8030 | tan, gray, ... |
| 8030-8060 | white, gray, ... |
| 8060-8090 | brown,... |
| 8090-8120 | tan, gray, ... |
| 8120-8150 | brown, gray, ... |
| 8150-8180 | brown, gray, ... |
| ... | .... |

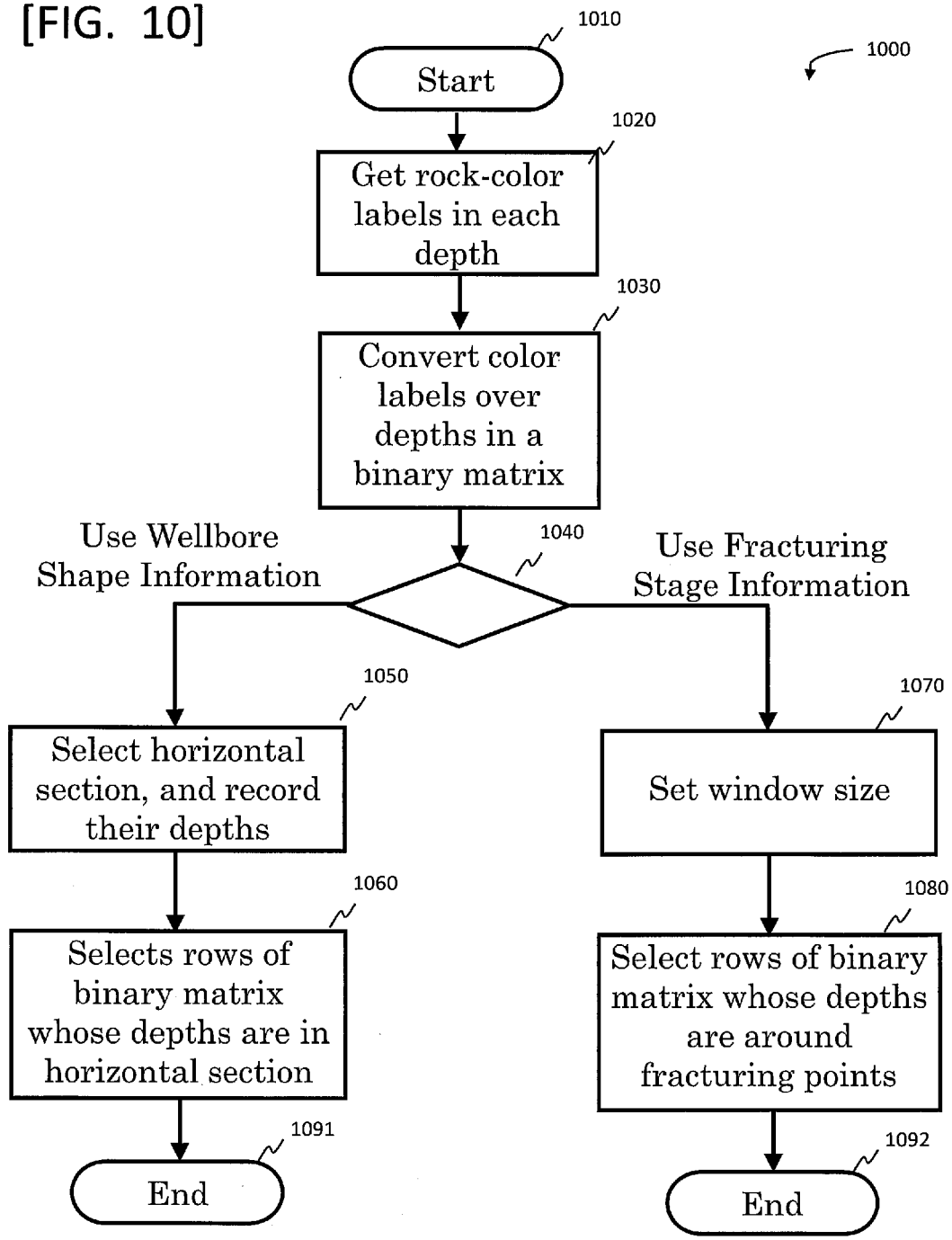
[FIG. 10]

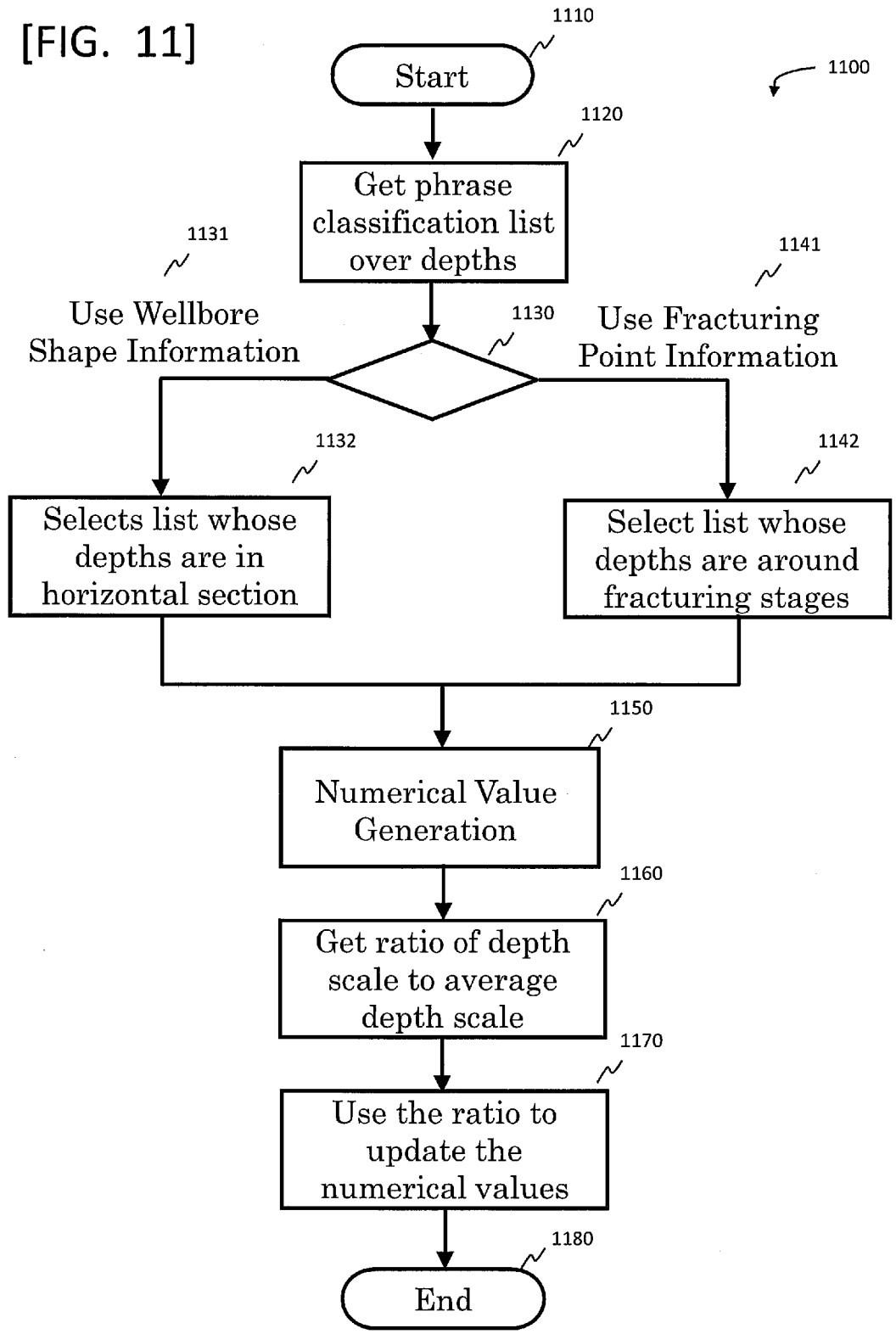

[FIG. 12]
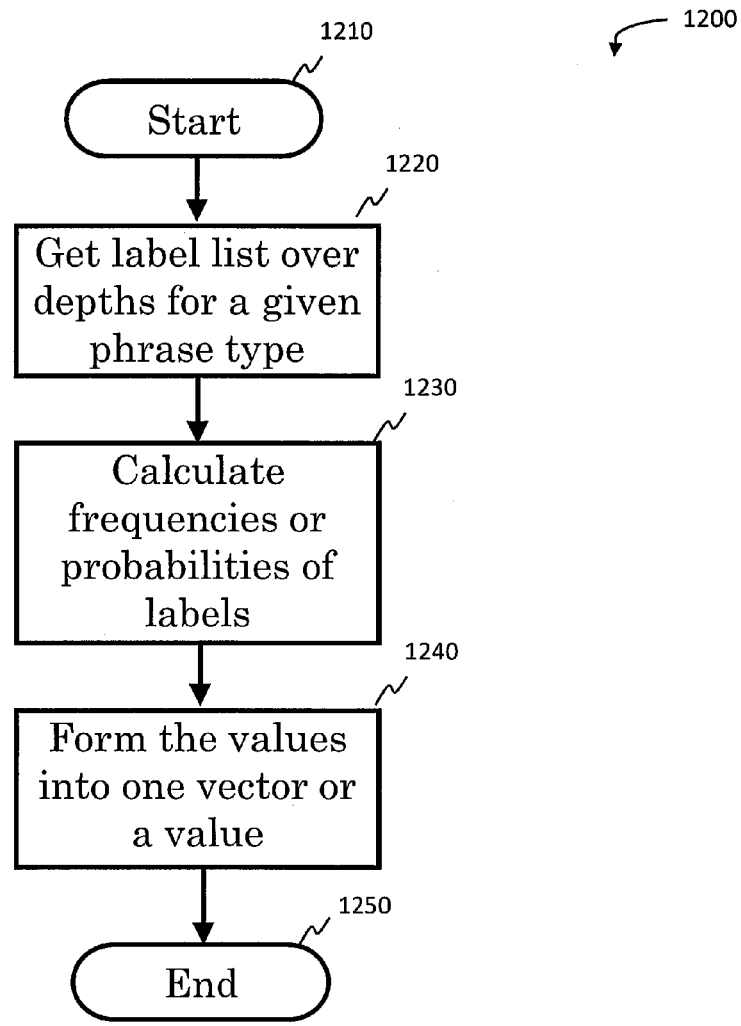

[FIG. 13]
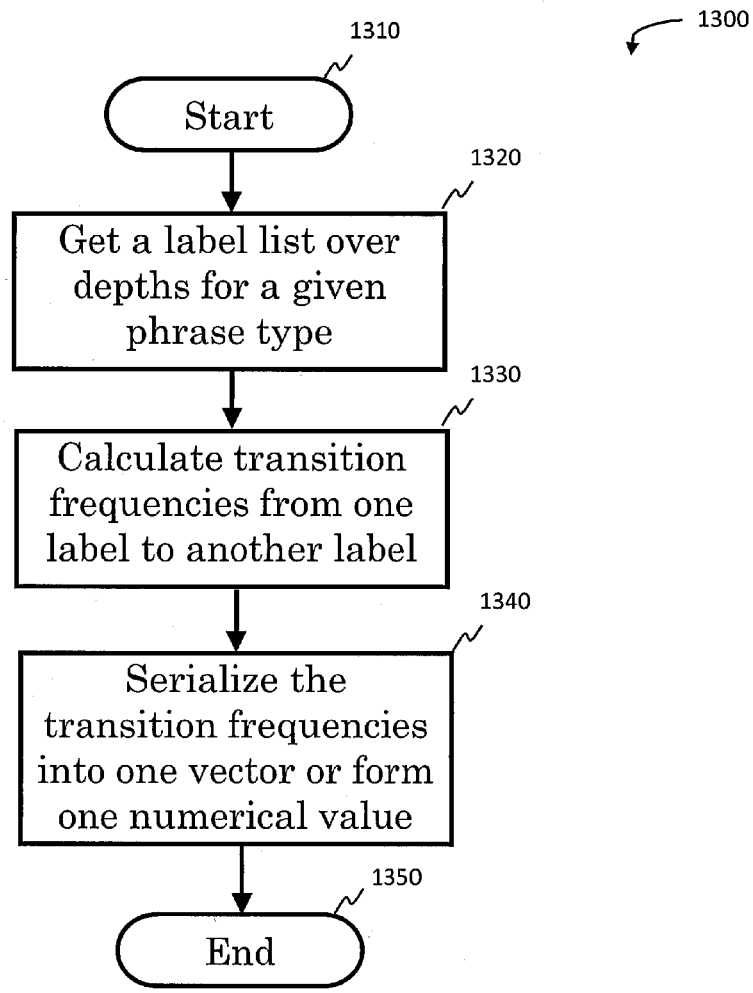

[FIG. 14]
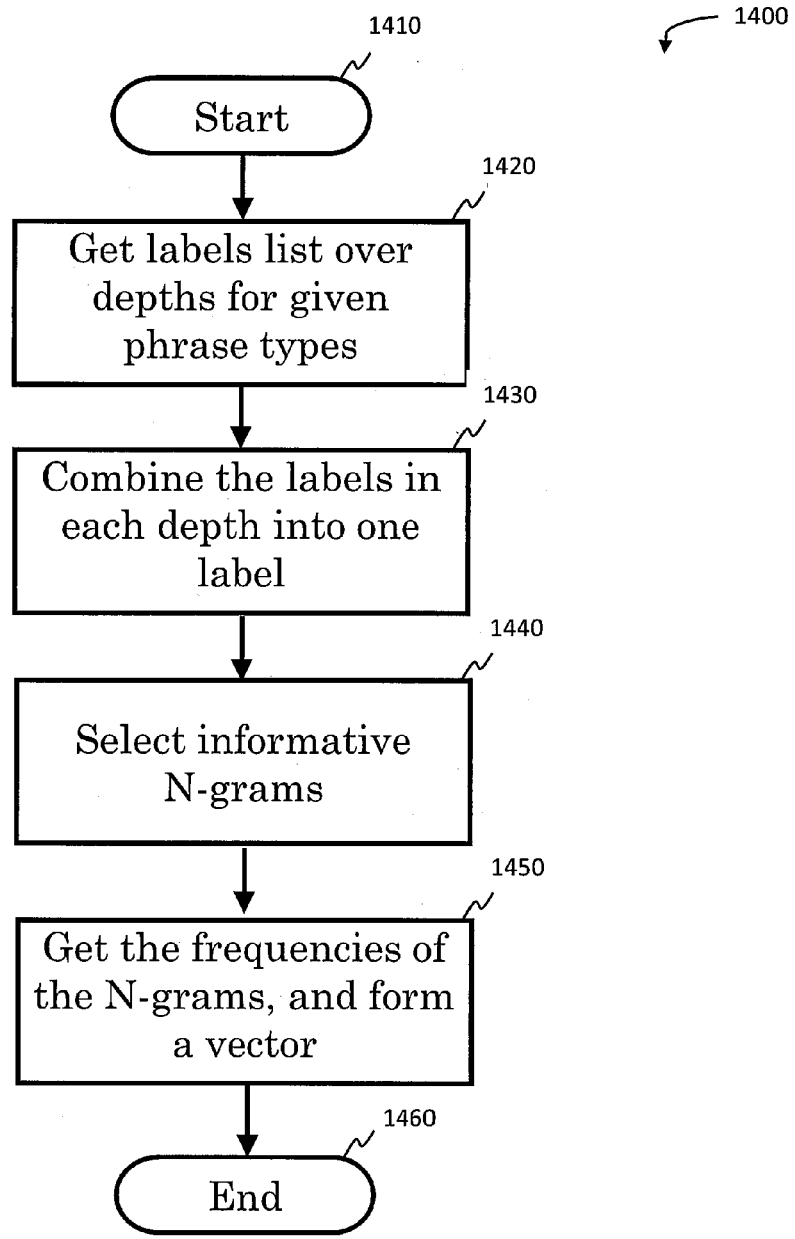

[FIG. 15]
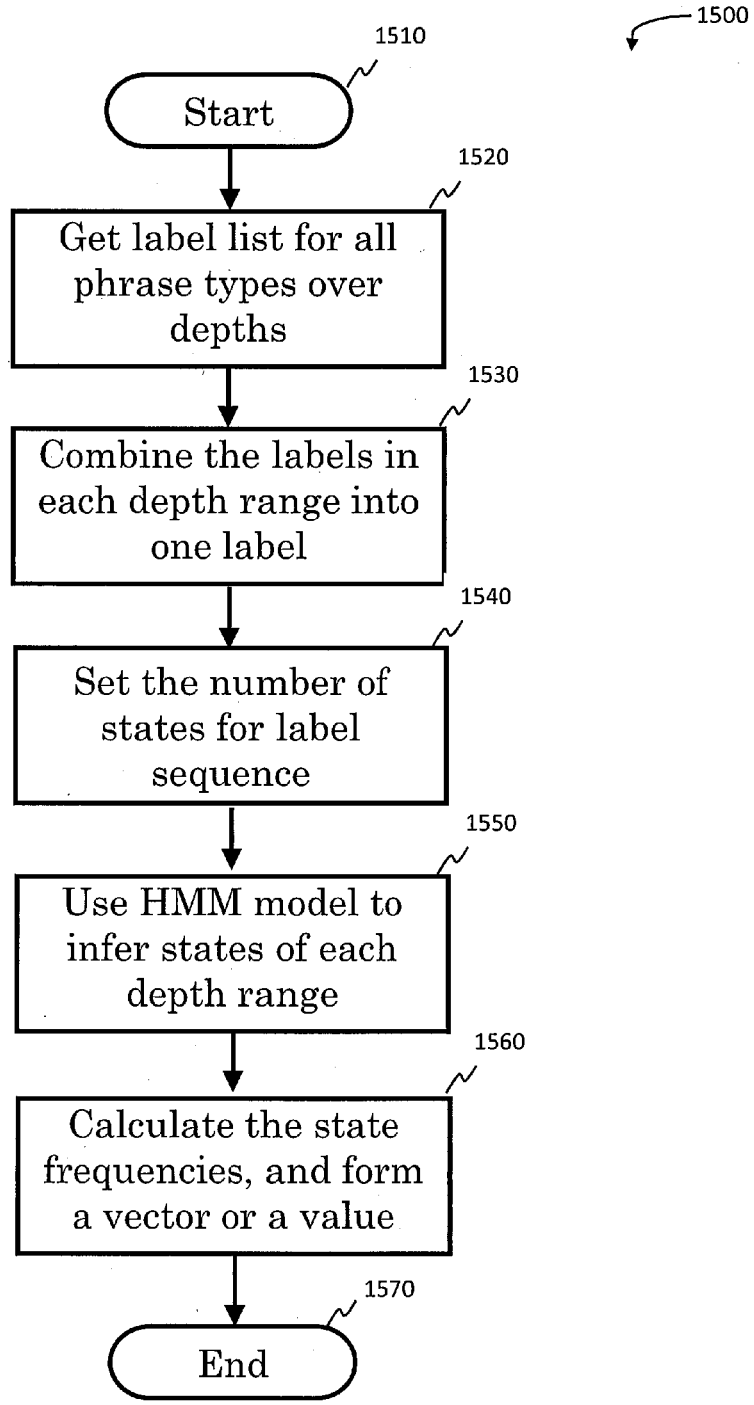

[FIG. 16]
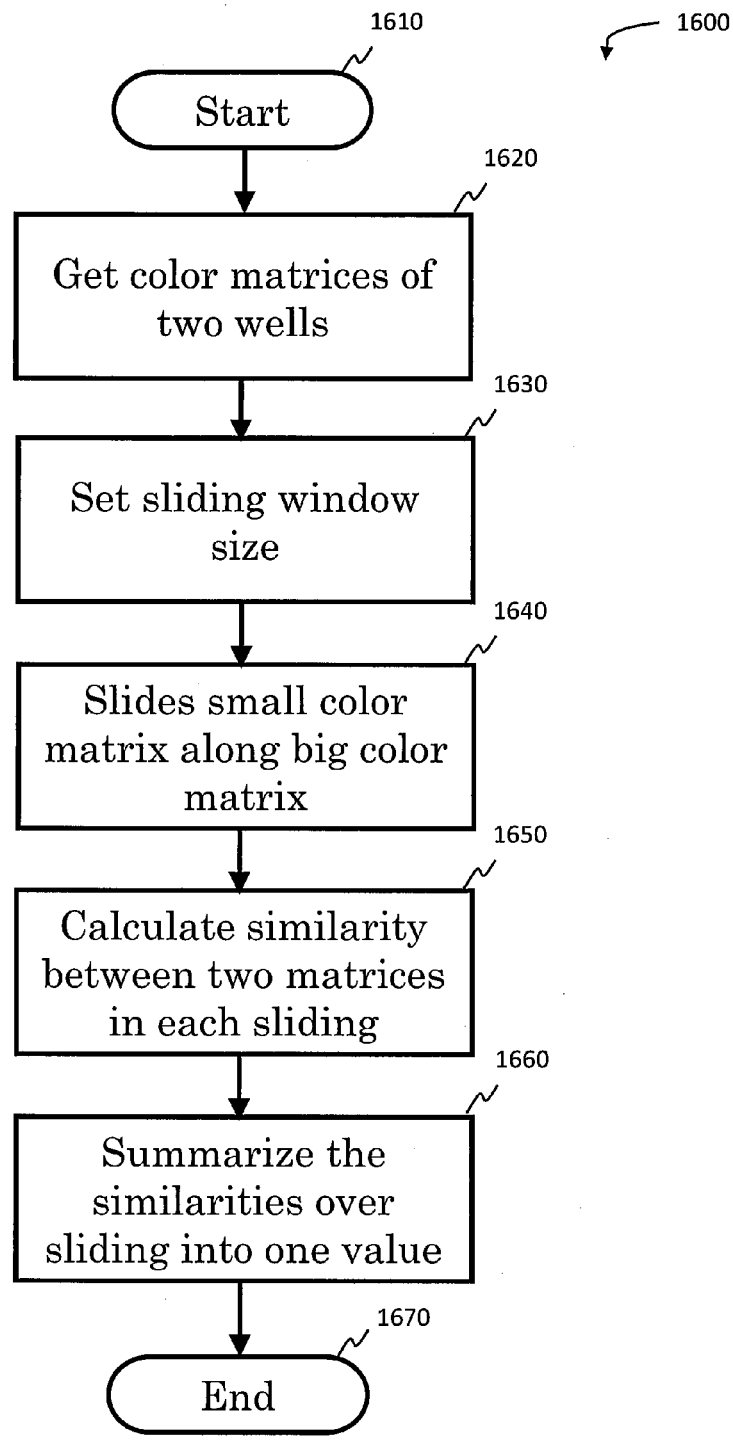

[FIG. 17]
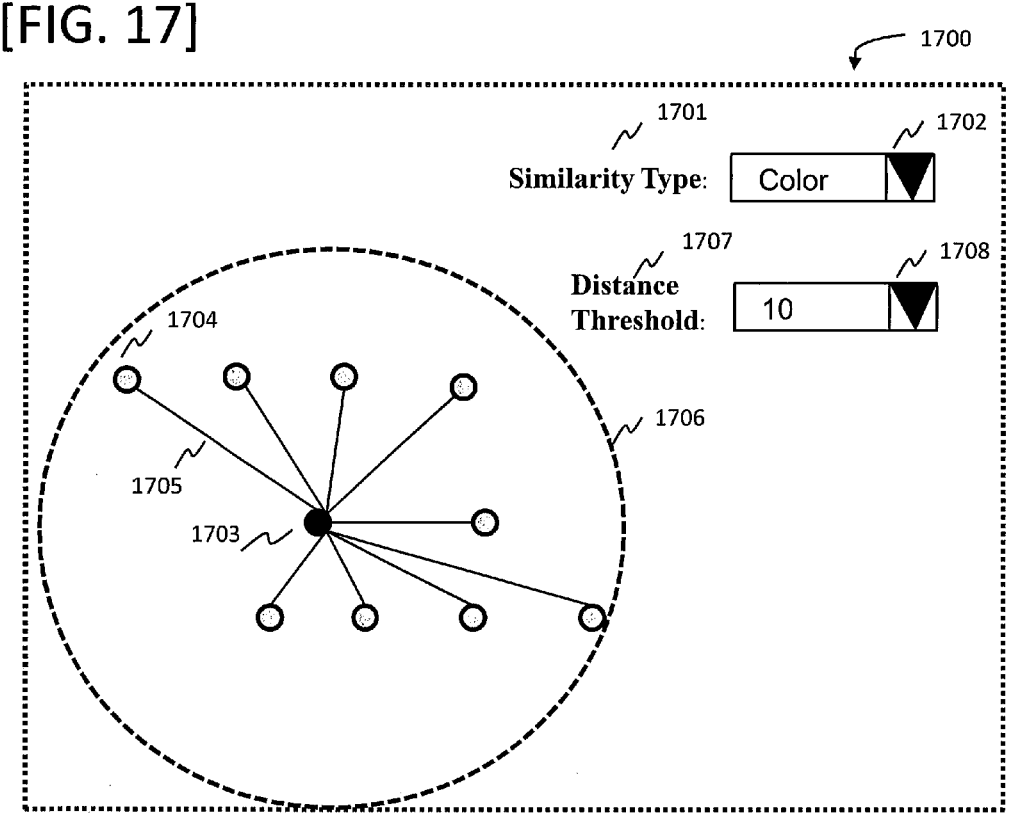
[FIG. 18]
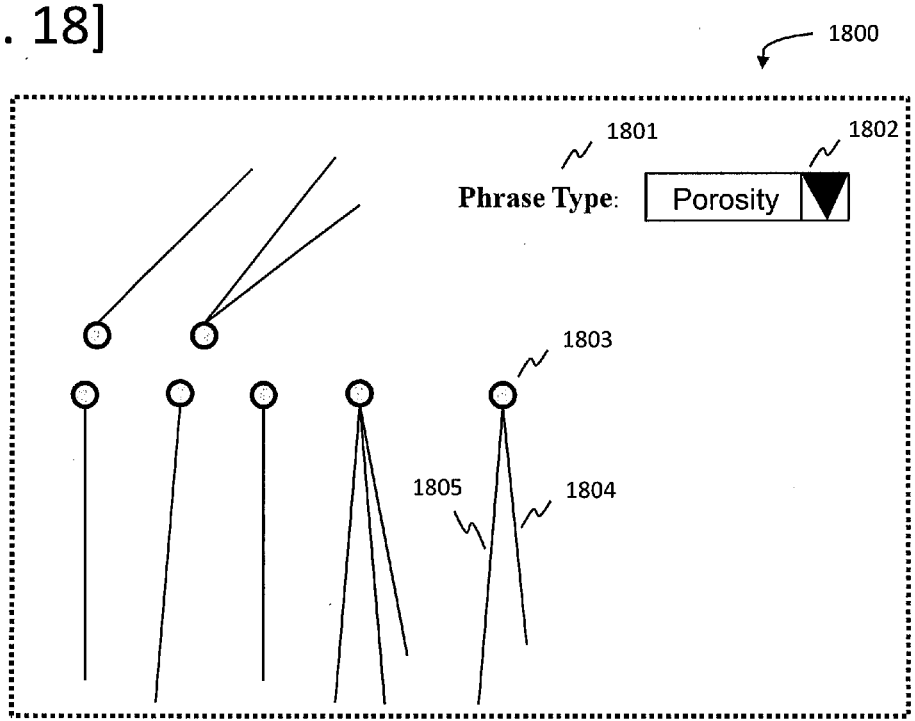

[FIG. 19]
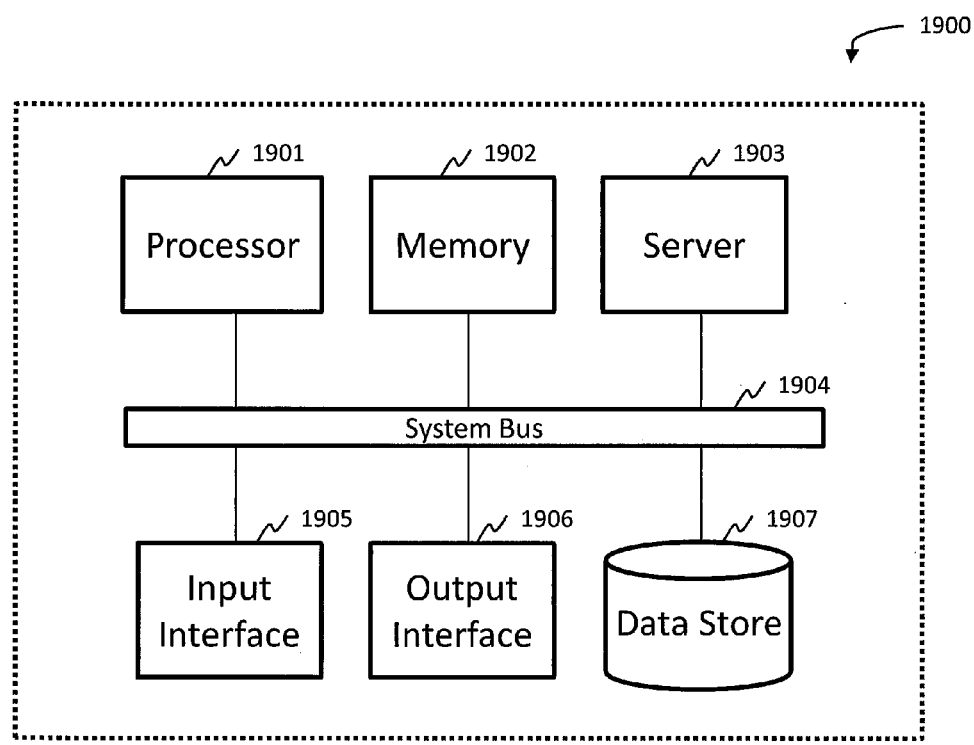

INFORMATION ANALYSIS SYSTEM

TECHNICAL FIELD

The present invention relates to an information extraction and analysis system for geology documents and logs.

BACKGROUND ART

In the shale oil and gas industry, characteristics of subsurface are important for identifying, accessing, and managing reservoir. Surface seismic data, geology images and well-logging data are widely used data sources for modeling the subsurface. It is necessary to integrate other kinds of data as many as possible to enable a better understanding on the subsurface. More specifically, the core analysis report in a geology report for a well, which is issued by a geologist who analyzes physical or chemical properties of sample rocks along a wellbore, gives an accurate insight on the subsurface of the well. The information in the geology report complements surface seismic data and well-logging data in the formation evaluation for the well reservoir that helps to estimate the well's potential productivity and optimize production operations.

[WO 2011077300 A2] PTL1 shows that a data processing method is proposed to process data points distributed throughout a geological volume, each data point being associated with seismic attributes and/or geometric attributes.

CITATION LIST

Patent Literature

PTL 1: PCT Publication Number WO 2011/077300 A2

SUMMARY OF INVENTION

The problem solved by this invention is to convert text information in a geology report to numerical values which reflects geological characteristics of a well's subsurface. Prior art referred above cannot be applicable to this problem. Since text information in the geology report is in the natural language form. This information is not widely used in this industry, due to the fact that the text information can be hardly extracted and summarized into numerical values and integrated into current physical geology models or statistical models.

To solve the above problem, we disclose: An information analysis system configured for execution on a processor of a computing device comprising: a database stores phrase database including a phrase dictionary and labeled phrases, and wellbore database including wellbore information; a text analysis process unit that converts text information in geology report to numerical value that reflects geological characteristics of rock samples along wellbore, wherein text analysis process unit further comprising: a report receiver unit that receives geology report from user interface; a phrase extraction unit that extracts phrases from list of pairs for depth and description in geology report; a phrase classification unit that classifies extracted phrases into specified number of class labels of phrases based on phrase database; and a numerical generation unit that transforms class labels of phrases over depth into numerical value based on wellbore information.

This invention makes the text information in geology report, which is often in a natural language form, easier to be integrated into current geology physical models or statistical models. Also, the numerical values extracted from the geology report can be integrated with other kinds of data, such as seismic data and well-logging data, to obtain more accurate and comprehensive analysis results.

BRIEF DESCRIPTION OF THE DRAWINGS

FIG. 1 is a diagram of an example system that facilitates extracting numerical values from a geology report.

FIG. 2 is an example of a phrase dictionary's format.

FIG. 3 is a diagram of a processing of a phrase extraction unit.

FIG. 4A and FIG. 4B are examples of formats of extracted phrases from a geology report.

FIG. 5 is a diagram of classifying phrases into a number of specific labels.

FIG. 6 is an example of a format of manually labeled phrases.

FIG. 7 is an example of a format of classification results of phrases.

FIG. 8 is a diagram of classifying rock-color phrases into rock-color classes.

FIG. 9 is an example of a format of classification results of the rock-color phrases.

FIG. 10 is a diagram of processing rock-color information by using physical information about wellbore.

FIG. 11 is a diagram of generating numerical values from labels of phrases.

FIG. 12 is a diagram of calculating frequencies or probabilities of labels.

FIG. 13 is a diagram of calculating transition frequencies.

FIG. 14 is a diagram of calculating numerical values based on n-gram.

FIG. 15 is a diagram of calculating numerical values based on a HMM.

FIG. 16 is a diagram of calculating rock-color similarities between wells.

FIG. 17 is an example of an interface illustrating similarities between wells.

FIG. 18 is an example of an interface illustrating numerical values along wellbores.

FIG. 19 is an example of a computing system.

DESCRIPTION OF EMBODIMENTS

With reference to FIG. 1, an example system 100 facilitates processing text information in a geology report. As described herein, in the system 100, a geology report stored in a database 110 is received from a user selection interface 120. A phrase extraction unit 130 extracts specific types of phrases from the geology report by using a phrase dictionary 161 in the database 160. A phrase classification unit 140 receives the extracted phrases from the phrase extraction unit 130 into a number of specific labels by using labeled phrases 162 or the phrase dictionary 161 in the database 160. A numerical value generation unit 150 receives classification results of the phrases obtained from a phrase classification unit 140, and converts the classification results into different sets of numerical values by using wellbore information 163 in the database 160. The unit 140 and unit 150 are two key components to convert the text in the natural language form to the numerical values. An application unit 170 receives the numerical values from the numerical value generation unit 150 to make further applications, such as visualization. The main characteristic of the numerical value generation unit 150 is that it utilizes the wellbore information 163.

The database 160 stores but not limited to three types of information, which are the phrase dictionary 161 that consists of a list of keywords for phrases that an end-user is interested in and prefers to extract, the labeled phrases 162 that consists of manually labeled phrases which are used in the phrase classification unit 140, the wellbore information 163 that depicts physical information about a wellbore. The physical information about a wellbore includes but not limited to the following information, which are wellbore shape, location of fracturing point, and depth measure scale. The phrase dictionary 161 can be either pre-defined by a system administrator or set by an end-user.

With reference to FIG. 2, it is an example of a format of the phrase dictionary 160. The phrase dictionary 160 can be formatted as a table that includes two columns, which are labeled by dictionary type 210 and keywords 220. The dictionary type specifies the types of phrases that the phrase extraction unit 130 extracts. For instance, the phrase type could be rock color, oil stain, porosity, and cut. Oil stain is a kind of oil show, and is left on rock samples. It is an indicator for a high possibility of bearing oil. Porosity is the volume of the non-solid portion of the rock filled with fluids, divided by the total volume of the rock. Cut describes the following outcome: if hydrocarbons are present in the rock, they will disseminate into the solvent, giving the entire solvent a distinctive color under ultraviolet light. The column labeled by keywords 220 lists the keywords for each type of phrase. For example, keywords for the color phrase type could be Red, Brown, White, Green, and Grey. The keywords of each type are not limited to ones illustrated in Table 200. Other types of phrases can be included. For example, the phrase type about rock texture can be also defined. Note that the processing steps for the phrase type of texture are the same as the ones for phrase type about rock-color. Similarly, the keywords for each type of phrase are not limited to the ones listed in table 200.

With reference to FIG. 3, it is a diagram of a processing of the phrase extraction unit 130. The phrase extraction unit 130 extracts phrases from a geology report by matching the keywords defined in the phrase dictionary 161. This process starts at 310 and completes at 390.

The step 320 determines whether or not a geology report is an image file. Some geology reports are stored in the form of scanned images. If a geology report is an image, it is necessary that the step 331 extracts text from image by using OCR (Optical Character Recognition) technique. A geology report is often formatted into a list of pairs for a depth range and the description about the rock samples in the depth range. Extracting texts only from the image is not sufficient to build up the pair relationship between a depth range and a rock description. It means that it is not clear that a depth range corresponds to the description about rock samples in that depth range. In the step 332, layout analysis is performed to record coordinates of depth blocks and rock description blocks in an image file. In the step 333, the relationship between a depth-range block and its corresponding rock-description block is built by using either specified rules or machine learning methods. After a depth-range block and a rock description block is paired in step 333, a list of pairs for a depth range and rock description for the depth range is extracted in the textual form.

In the step 340, a rock description is divided into a plurality number of phrases. In the case that the rock description is composed of several phrases connected by commas, the simplest way for phrase separation is that commas between phrases are identified, and phrases in the rock description are formatted into a list by removing out the commas. It is to be understood that the step 340 is not limited to the above-described case. Any techniques for phrase separation based on machine learning methods can be applied.

In the step 350, phrases in a depth range are extracted by using the phrase dictionary 161. It means that if a phrase includes a keyword for a phrase type defined in the phrase dictionary 161, the phrase is supposed to be extracted. Let us take a phrase 'good porosity' as an example. This phrase includes keyword 'porosity' for the phrase type about 'porosity', and is therefore extracted as the 'porosity' type.

In the step 370, the phrases in each depth range are stored a phrase list in a database 380, and these phrases will be used in the phrase classification unit 140.

With reference to FIGS. 4A and 4B, they are examples of formats for the phrases stored in the database 380. FIG. 4(A) is an example of a format for rock-color phrases over depths. FIG. 4(B) is an example of a format for oil-stain phrases over depths. Note that the formats for both porosity and cut phrases are the same as one for the oil-stain phrases.

With reference to FIG. 4(A), the table 410 includes two columns, which are labeled by depth range 411 and rock-color phrases 412. Depth range 411 is often a depth pair in feet, which is composed of a start depth and an end depth. For a depth range, the column labeled by 412 includes a list of rock-color phrases extracted from the rock description in that depth range. For example, "cream tan, light tan to tan, cream gray . . . " is the list of rock-color phrases in the depth range "8000-8030".

With reference to FIG. 4(B), the table 420 includes two columns, which are labeled by depth range 421 and oil-stain phrases 422. Similar to the table 410, the depth range 421 is a depth pair. For each depth range, the column labeled by 422 includes a list of oil-stain phrases extracted from the rock description in that depth range. For example, "live oil stain, . . . " is the list of stain phrases in the depth range "8000-8030".

With reference to FIG. 5, it is a diagram of illustrating the process of the phrase classification unit 140. Exclusive to rock-color phrases, the phrases referred in FIG. 5 cover oil-stain phrases, porosity phrases, and cut phrases. It starts at 510 and completes at 560.

In the step 531, the phrases are manually labeled, which are stored in the database 532. In the step 533, a classifier is trained by using the labeled phrases in the database 532.

The step 520 firstly receives a phrase list for a given phrase type. For example, it receives a list of oil-stain phrases over depths. In the step 540, the phrases in the list are classified into a number of specific labels with probabilities. The probabilities of each label can be obtained by a probabilistic classification model. For example, a oil stain phrase 'live oil stain' is classified as positive (PT) with a probability 0.9, weak positive (WP) with a probability 0.1, weak negative (WN) with a zero probability, and negative (NG) with a zero probability. In the case that there is more than one phrase of the given phrase type in a depth, a summarization for the labels with probabilities is required. The simplest way of making a summarization for more than one label with probabilities is to make average. For example, suppose that another phrase about oil stain, such as 'light oil stain', appears together with the phrase 'live oil stain' in the same depth range. 'Light oil stain' is classified as PT with a probability 0.7, WP with a probability 0.3, WN with a zero probability, and NG with a zero probability. The averaging result in this depth range is as follows: PT with a probability 0.8, WP with a probability 0.2, WN with a zero probability, and NG with a zero probability. It is to be understood that the summarization method for more than one phrase in one depth range is not limited to averaging. The step 550 stores the above classification results into database.

The format of the labeled phrases 532 is illustrated in FIG. 6, which takes the oil-stain phrases as an example. It is to be understood that the formats of the labeled phrases for both porosity and cut types are the same as this example. The table 600 includes two columns, which are labeled by oil-stain phrases 610 and labels 620. The label is defined as a degree of oil stain. A label set of the phrases includes four types, which are positive (PT), weak positive (WP), weak negative (WN), and negative (NG). For example, 'live oil stain' is labeled as PT, which means that there is much oil stain in the rock sample. It is to be understood that the label definition for the oil-stain phrases also applies the phrases of both porosity and cut types. Note that the number of labels is not limited to four. It can be set to be another number.

With reference to FIG. 7, it is an example of a format for the phrase labels and probabilities that are obtained by the phrase classification unit 140. The format illustrated in FIG. 7 takes the oil-stain phrases as an example. Exclusive to the rock-color phrase type, this format applies to the ones defined in phrase dictionary 161, which are oil stain phrases, porosity phrases, and cut phrases. It means that different phrase types correspond to different tables. Table 700 includes columns, which are labeled by depth 710, PT 721, WP 722, WN 723, NG 724, and label 725. The values in the columns of PT, WP, WG, and NG are probabilities for each label. The label in a depth range is defined as the one with the highest probability. For example, the probabilities of PT, WP, WN and NG in the depth range 8000-8300 are 0.7, 0.2, 0.1, and 0, respectively. The label in the depth range 8000-8030 is therefore set as PT.

With reference to FIG. 8, it is a diagram of classifying rock-color phrases into rock-color classes. The phrases referred in FIG. 8 are the rock-color phrases. It starts at 810 and completes at 860.

In the step 832, a rule-based classifier is created by using the rock-color phrase dictionary 831. One simple example of creating a rule-based classifier is that if a phrase includes a keyword in the rock-color phrase dictionary, the phrase is classified into the color class specified by the keyword. We take a phrase "from light brown to dark brown" as an example. This phrase includes a keyword, say 'brown', in the color phrase dictionary. Therefore, this phrase is classified into the class of brown color. In the step 820, a list of rock-color phrases over depths is received. In the step 840, the rock-color phrases over depths are classified into one of rock-color classes. In the step 850, the rock-color labels for the phrases over depths are stored into a database.

With reference to FIG. 9, it is an example of a format for the table that stores the rock-color labels over depths. Table 900 includes two columns, which are depth range 910 and rock-color classes 920. The values in depth range 910 are often the form of a number pair, which indicates the range of depth. The values in the rock-color classes 920 are the rock-color labels obtained by the rule-based classification model 832. For example, the list of rock color in the column 920, such as "tan, gray, . . . ", are the labels of rock-color phrases in the depth range 8000-118030.

With reference to FIG. 10, it is a diagram of generating a rock-color matrix by using physical information about wellbore. It starts at step 1010, and completes at step 1091 or step 1092.

In the step 1020, a list of the color labels over depths of a well is received, whose format is illustrated in the table 900. In the step 1030, the list of rock-color labels over depths is converted into a rock-color matrix. One method for this conversion is that: (1) generate a full zero matrix with the number of rows equal to the list length and the number of columns equal to the number of keywords defined in the rock-color phrase dictionary 831; (2) scan the rock-color labels in each depth range, and match them with the keywords in the rock-color phrase dictionary. If a rock-color label is matched with one keyword, the corresponding entry in the rock-color matrix is set to be 1, otherwise set to be 0. Therefore, a binary rock-color matrix with either 0 or 1 value can be generated after scanning all depth ranges of a well. It is to be understood that the method of generating a rock-color matrix is not limited to the above one. For example, the matrix with weights can be generated if a degree of a color is defined. For example, "dark red" are "light red" are two expressions about degrees of the red color. It is also to be understood that the matrix about rock texture can be also generated by using the similar way if a texture phrase dictionary is defined.

In the step 1040, it determines which type of physical information about wellbore is used to have the further process of the rock-color matrix obtained at the step 1030. The physical information about wellbore referred here includes the wellbore shape and fracturing stages' locations in the horizontal section of a wellbore. The selection on the physical information can be a default setting in the system, or be selected by the end-user.

If the information about wellbore shape is determined, in the step 1050, the depth range in the horizontal section of a wellbore is recorded. Note that a wellbore for a Shale well often has two sections, which are a vertical section and a horizontal section. The step 1060 selects the rows of the rock-color matrix, whose depth ranges correspond to the horizontal section of the wellbore.

If the information about fracturing stages is determined, in the step 1070, the window size centered on each fracturing stage is set. The step 1080 selects the rows of rock-color matrix whose depth ranges fall into the range of a window centered on each fracturing stage. In the case that the windows of two different fracturing stages are overlapped, the rows of the rock-color matrix are selected for only one time.

With reference to FIG. 11, it is a diagram of generating numerical values based on the classification results of phrases. Exclusive to rock-color phrases, the phrases referred in FIG. 11 are oil stain phrases, porosity phrases, and cut phrases. It is to be understood that this diagram 1100 applies to each phrase type. It starts at 1110, and completes at 1180.

The step 1120 receives the phrase classification results over depths from the database. The step 1130 determines which kind of physical information about wellbore is used to have the further process on the classification results over depths.

If the information about wellbore shape is determined, the step 1132 selects the rows of the label table, which is illustrated in the table 700, with the condition that their depth ranges correspond to the horizontal section of a wellbore. If the information about fracturing stages is determined, the step 1142 selects the rows of the label table with the condition that their depth ranges fall into the range of a window centered on each fracturing stage along the wellbore. In the case that windows of two different fracturing stages are overlapped, the rows of the label table are selected for only one time.

The step 1150 generates numerical values by using the phrase classification results and the physical information of a wellbore. The numerical values represent either a vector with a fixed dimension or a numerical scalar. The numerical values generated by the step 1150 reflect the characteristic of a given rock property along the wellbore, such as oil stain, porosity, and cut. The example methods for numerical value generation are shown in FIG. 12, FIG. 13, FIG. 14, and FIG. 15. It is to be emphasized that any variant of methods using the phrase label sequence and/or the physical information about the wellbore can be applied in this invention.

The step 1160 calculates a ratio of depth-range scale of current well to the average depth-range scale of wells in a specified area. The depth-range scale is generally defined as the span of the depth range, which is often in feet. For example, the depth-range scale for 8000-8030 is 30 feet. If the average depth-range scale of wells in a specified area is unknown, the step 1060 sets the ratio to be 1 automatically.

The step 1170 uses the ratio, which is obtained from the step 1160, to update the numerical values obtained from the step 1150. For example, if the ratio of depth-range for the current well is 0.9, and the numerical value is 0.8, the updated numerical value is 0.72, which is the result of 0.9 times 0.8. Another example is that, if the numerical values are represented in a two-dimensional vector, i.e., [0.7, 0.2], the updated vector is [0.63, 0.18]. It is to be understood that the updating methods are not limited to the above ones.

In the step 1150, there are a variety of methods to generate numerical values from the classification results for a given phrase type. The following illustrates two examples. It is to be understood that the generation methods are not limited to these two methods. Any variants based on the phrase classification results over depths can be applied in this invention.

With reference to FIG. 12, it is a diagram of generating the numerical values based on the frequencies or probabilities of labels for a given phrase type. It is to be understood that, exclusive to the phrase type of rock color, this process applies to phrase types, such as oil stain phrases, porosity phrases, and cut phrases. This process starts at 1210, and completes at 1250.

The step 1220 receives a list of phrase classification results, which is will be processed by the step 1132 or the step 1142. The step 1230 calculates the frequencies or probabilities of label over depths. In the case of label frequencies, the label sequence over depths, for example, is PT, PT, PT, WP, and NG. The frequencies of PT, WP, WN, and NG are 0.5, 0.25, 0, and 0.25, respectively. In the case of label probabilities, for example, in the depth range 8000-8030, the probabilities of PT, WP, WN, and NG are 0.7, 0.2, 0.1, and 0, respectively. In the depth range 8030-8060, the probabilities of PT, WP, WN and NG are 0.4, 0.6, 0, and 0, respectively. A simple method of summarizing the probabilities in the two depth ranges is to average the labels' probabilities. The probabilities of PT, WP, WN, and NG are therefore calculated as 0.55, 0.4, 0.05, and 0, respectively. It is to be understood that the methods of calculating the frequencies or the probabilities are not limited to the above ones. Any variants of the methods can be applied in this invention.

The step 1240 forms the values obtained by the step 1230 to a numerical vector, or summarize the values into a numerical scalar. In the case of numerical vector, for example, the probabilities for PT, WP, WN, and NG are 0.55, 0.4, 0.05, and 0, respectively. The numerical vector, [0.55, 0.4, 0.05, 0], can be formed by catenating four probabilities. In the case of numerical scalar, for example, a formulation, like (PT_val+WP_val)/(1+WN_val+NG_val), can be used to calculate a numerical scalar from the probabilities or frequencies obtained by the step 1230, where PT_val, WP_val, WN_val and NG_val are values for PT, WP, WN, and NG, respectively. It is to be understood that the methods of calculating a numerical vector or a numerical scalar are not limited to the above ones. Any variants of the methods can be applied in this invention.

With reference to FIG. 13, it is a diagram of generating the numerical values based on the label transitions. It is to be understood that, exclusive to rock-color phrases, this process applies to the phrase types, such as oil stain, porosity, and cut. This process starts at 1310, and completes at 1350. The main effect of this process is that the information about label transition facilitates differentiating label sequences that have the same label frequencies.

The step 1320 receives a list of phrase classification results given a phrase type. For a label sequence over depths, the step 1330 calculates transition frequencies from one label to another label. For example, the label sequence is PT, PT, PT, WP, and NG. In this sequence, the count from PT to PT is 2, the count from PT to WP is 1, and the count from WP to NG is 1. The transition frequencies can be easily derived by dividing these counts by transition length, i.e., 4. Therefore, we have freq(PT, PT) is 0.5, freq(PT, WP) is 0.25, and freq(WP, NG) is 0.25.

The step 1330 serializes the transition frequencies of labels into a numerical vector with a fixed dimension, or summarizes the transition frequencies of labels into a numerical scalar. In the case of the numerical vector, the meaning of each entry in the vector is defined. For example, a four-dimensional vector is defined, in which the first entry is specified as the frequency from PT to PT, the second entry is specified as the frequency from PT to WP, the third entry is specified as the frequency from WP to WN, the fourth entry is specified as the frequency from WN to NG. For example, the frequencies of label transition are as follows: freq(PT, PT) is 0.5, freq(PT, WP) is 0.25, and freq(WP, NG) is 0.25. The four-dimensional vector, [0.5, 0.25, 0, 0], can be easily derived by contenating the transition frequencies. It is to be understood that the definition of each entry in the numerical vector can be set by either the system administrator or the end-user. In the case of the numerical scalar, for example, the numerical scalar can be summarized by calculating the total transition frequencies among PT and WP. It means that freq(PT, PT), freq(PT, WP), freq(WP, PT), and freq(WP, WP) are summed up. In the above example of label transition, a scalar, i.e., 0.75, which is sum of 0.5, 0.25, 0, and 0, can be derived. It is to be understood that the summarization method for the numerical scalar can be selected by either the system administer or the end-user. It is also to be understood that the methods are not limited to those explained above. Any variants of the methods can be applied in this invention.

With reference to FIG. 14, it is a diagram of calculating numerical values from the phrase label sequence based on N-gram. The processing example illustrated in FIG. 14 utilizes the combined labels over depths, each of which is composed of phrase labels in each depth range. It is to be understood that, except for the combined labels, this process can be also applied to the label sequence of a given phrase type. This process starts at 1410, and completes at 1460. The main effect of this process is that N-grams help to find informative local patterns of the label sequence.

The step 1420 receives a list of phrase classification results for different phrase types, such as oil stain phrases, porosity phrases, and cut phrases.

The step 1430 combines the labels of selected phrase types in each depth range into one label. For example, for the phrase type of oil-stain, the label in depth range 8000-8030 is PT; for the phrase type of porosity, the label in the depth range 8000-8030 is NG; for the phrase type of cut, the label in the depth range 8000-8030 is PT. A combined label, such as 'PT_NG_PT', is obtained by contenating the labels of the three types. The combined label is considered as a word in the area of Natural Language Processing (NLP). It is to be noted that the order of phrase types can be considered in the label combination. In this case, two combined labels, such as 'PT_NG_PT' and 'PT_PT_NG', are different. Otherwise, the two combined labels, which include two PTs and one NG, are regarded as the same combined label. It is to be understood that the order of phrase types influences the space of uni-grams. For example, given four possible labels for each aspect, if the order is considered, the number of combined labels for three phrase types is 64; otherwise, the number of combined labels for three phrase types is 21. Note that the combined labels over depths represent the polarity change of the three aspects. We take a combined label sequence, such as 'PT_PT_PT', 'PT_PT_NG', 'PT_WP_NG', as an example. If the order is not considered, the polarity change on the whole is depicted. In this example, the degree positive of the combined labels decreases, since the number of PT decreases from 3 to 1. However, in this case, the information about which aspect has which label is ignored. If the order is considered, the more granular change on the polarity can be depicted, since entries of a combined label are fixed. Suppose that the entry order, such as oil stain, porosity, and cut, is defined. In the above example, the polarity of oil stain in the label sequence does not change. The positive degree of cut decreases more quickly than that of porosity. It is to be understood that whether the order of labels is considered or not can be determined by either the system administer or the end-user.

The step 1440 selects discriminative N-grams for a number of wells. It is implemented by listing up N-grams of combination labels over depths for the wells, and using some criteria to select N-grams. If N is set to be 2, and the combined label sequence is 'PT_PT_WP', 'WP_PT_WP', 'NG_PT_WP', and 'NG_NG_WP'. The 2-grams for this combined label sequence are listed as follows: ('PT_PT_WP', 'WP_PT_WP'), ('WP_PT_WP', 'NG_PT_WP'), ('NG_PT_WP', 'NG_NG_WP'). It is noted that the value of N can be set by either the system administer or the end-user. For the criterion of selecting the N-grams, a simple way is to select N-grams with high frequencies. It is to be understood that the criterion is not limited to frequency counting, and another criterion, such chi-square, can be utilized. It is also noted that additional information, such as oil production, can be used together with the criterion to select N-grams.

The step 1450 summarizes the frequencies of the selected N-grams into one numerical vector. It is noted that the dimension of the numerical vector is equal to the number of the selected N-gram. The number of the selected N-grams could be set by either the system administer or the end-user. N-grams of labels is able to reflect the local characteristic of label sequence. The frequencies of N-grams are therefore able to depict the local change of class labels for a well.

With reference to FIG. 15, it is a diagram of calculating numerical values from the phrase label sequence based on Hidden Markov Model (HMM). The processing example illustrated in FIG. 15 utilizes the combined labels over depths, each of which is composed of phrase labels in each depth range. It is to be understood that, exclusive to the rock-color phrases, this process can be also applied to labels over depths for a given phrase type. This process starts at 1510, and completes at 1570. The main effect of this process is that the HMM might be able to summarize labels of different phrase types into a more abstract symbol. The statistics on the symbol sequence learned by the HMM provide another way of representing the label sequence.

The step 1520 receives a list of phrase classification results for different phrase types, such as oil stain phrase, porosity phrase, and cut phrase.

The step 1530 combines the labels of selected phrase types in each depth range into one label. This process is the same as the step 1430. The step 1540 sets the number of states used in the HMM. The meaning of state in the HMM is at an abstract level. For example, a label observation in the depth range 8000-8030 is 'PT_PT_WP'. The state of this label observation may indicate the positive degree of the combined label.

The step 1550 utilizes the HMM to infer states of the combined label sequence over depths. It can be implemented as follows: (1) use the combined label sequences of wells as observations to train the HMM with N states. (2) Given a combined label sequence of a new well, infer the states of the combined label sequence. For example, the combined label sequence of a well is 'PT_PT_WP', WP_PT_WP', 'NG_PT_WP', and 'NG_NG_WP'. To train the HMM, it is required to encode the combined label. A way of encoding a label can be implemented as follows: (1) assign a value for each label. For example, PT is set to be 1, WP is set to be 2, WN is set to be 3, and NG is set to be 4. Therefore, a combined label, such as 'WP_PT_WP', can be encoded as a numerical vector, such as [2, 1, 2]. When a new label sequence is available, such as 'WP_PT_WP', WP_PT_PT', 'NG_PT_NG', and 'NG_NG_NG', the trained HMM can infer its state sequence, such as STATE1, STATE1, STATE2, STATE3.

It is to be understood that the training data for the HMM is not limited to the combined label. Any variant of label combinations can be also regarded as the observations of the HMM.

The step 1560 calculates the frequencies of each state over depths, and summarizes the frequencies into a numerical vector or a numerical scalar. It is noted that the dimension of the numerical vector is equal to the number of the defined states in the HMM. In the case of the numerical vector, for example, the number of states is 3, and the inferred state sequence is STATE1, STATE1, STATE2, and STATE3. The numerical vector regarding to the state frequencies can be derived as [0.5, 0.25, 0.25] if the first entry, the second entry and the third entry of this numerical vector are defined as the frequency of STATE1, the frequency of STATE2, and the frequency of STATE3, respectively. In the case of the numerical scalar, for example, the average frequencies of given states, such as STATE1 and STATE2, can be easily obtained, which are 0.75. It is to be understood that the methods of obtaining the numerical vector or the numerical scalar are not limited to the above ones. Any variants based on the state sequences can be applied in this invention.

With reference to FIG. 16, it is a diagram of calculating the rock-color similarity between two wells. It starts at 1610, and completes at 1670.

The step 1620 receives two rock-color matrices which are obtained by the step 1060 or the step 1080. Due to different rows of two rock-color matrices, it is required to slide the smaller one along the rows of the bigger one at a specified sliding step. The exceptional case is that the numbers of the rows of two rock-color matrices are the same. It facilitates similarity calculation without the sliding. The step 1630 sets the sliding window size. The step 1640 slides the smaller rock-color matrix along the rows of the bigger one. During the sliding, the step 1650 calculates the similarity between two matrices. An example of calculating the similarity between two binary matrices is to obtain the ratio of the number of the entry with value 1 to the number of all entries. After the sliding, a plurality number of similarities can be derived in each similarity calculation. The step 1660 summarizes the similarities into a value. An example of the summarization is to average these similarity values. It is to be understood that the methods of calculating the similarity between two matrices and similarity summarization are not limited to the above ones. Any variants of the methods can be applied in this invention.

With reference to FIG. 17, it is an example of an interface illustrating similarities between wells in a bird's-eye viewpoint. Location 1701 displays the text of 'Similarity Type'. Button 1702 is a pull-down button from which the user can select which phrase type is displayed. The possible phrase types are rock-color, porosity, oil stain, and cut. It is to be understood that the number of similarity types are not limited to the ones defined in the phrase dictionary 161. Location 1707 displays the text of 'Distance Threshold', which represents the geological distance from a selected well's wellhead. Button 1708 is a pull-down button from which the end-user can select the distance threshold. The wells, whose distances from the selected well are shorter than the distance threshold, are regarded as neighbors of the selected well, and the neighbor wells of the selected well are illustrated in the interface It is to be understood that the geographic locations of well heads for all wells are stored in a database, and the distance between any two well heads is calculated before the visualization.

Point 1703 represents the selected well's wellhead. Circle 1706 represents the neighboring area, whose radius is less than the distance threshold. Point 1704 is the wellhead of a neighbor well of the selected well 1703, whose distance from the well 1703 is shorter than the distance threshold 1708. The line links between point 1704 and point 1703, and the color of the line illustrates the degree of the similarity, which is calculated by the numerical vector or a numerical scalar. One merit of using this visualization is that it enables the end-user to understand how similar the neighbor wells are with respect to the selected well from different viewpoints, such as rock color, oil stain, porosity and cut. It may also be able to provide the end-user a hint for determining the geographic location of a new planned well.

With reference to FIG. 18, it is an example of an interface illustrating the probabilities of phrase labels along the wellbores in a bird's-eye viewpoint. Location 1801 displays the text of 'Phrase Type'. Button 1802 is a pull-down button from which the user can select which phrase type is displayed. The possible phrase types are porosity, oil stain, and cut.

Point 1803 represents the wellhead of a well. The lines 1804 and 1805 are two lateral sections of wellbore for this well. The colors shown along the lines change according to measured depths. The color in the line is a kind of representative of the probabilities of phrase labels illustrated in FIG. 7. A simple example is that the probability of phrase label in each depth range is scaled in the degree of gray color. It is to be understood that any variant of methods to determine the colors based on the probabilities of phrase labels can be applied in this invention. One merit of using this visualization is that it enables the end-user to understand how geological characteristics, such as oil stain, porosity and cut, change along a wellbore. It may also be able to provide the end-user a hint for determining the fracturing locations.

It is to be understood that the output interface to show the information in geology report is not limited to the ones illustrated in FIG. 17 and FIG. 18. Any variants of interfaces showing the numerical values from geology report, such as 3D visualization, can be applied in this invention.

With reference to FIG. 19 that shows how this system is constructed by hardware, the computing device 1900 includes a data store 1907 that is accessible by the processor 1901. The computing device 1900 may refer to the phrase classification unit 140 and the numerical value generation unit 150. The data store 1907 may refer to the database 160 and phrase classification results illustrated in FIG. 7 and FIG. 9. The processor 1901 may access the memory 1902 by way of a system bus 1904. The computing device 1900 also includes an input interface 1905 that allows external devices to communicate with the computing device 1900. The computing device 1900 also includes an output interface 1906 that displays the numerical values extracted from geology report to the end-user. The output interface 1906 may refer to the interfaces illustrated in FIG. 17 and FIG. 18. The computing device 1900 also includes a server that is responsible for the computation tasks.

This invention proposes a systematic method to process the text information in a natural language form in geology report into a set of numerical values based on various kinds of properties about sample rocks along wellbore. These numerical values can be used in the visualization, as illustrated in FIG. 17 and FIG. 18. In addition to the visualization, these sets of values can be also integrated into current geology physical models or statistical models for other applications.

The invention claimed is:

1. A system which processes a geology report about a subsurface of a well and visualizes information describing a plurality of rock samples collected along a drilled borehole of the well, comprising:
 a processor;
 a database that stores phrase database for rock properties including a phrase dictionary, a plurality of labeled phrases, and a wellbore database including wellbore information of a plurality of wellbores; and
 a memory that stores instructions that cause the processor to execute:
  a report receiver unit that receives a geology report from a user selection interface including text information of a plurality of phrases for rock properties describing the rock samples, which are collected at depth intervals of the drilled borehole;
  a phrase extraction unit that, for each type of the rock properties, extracts a plurality of phrases about the rock properties and a corresponding plurality of depth intervals of the drilled borehole from the geology report based on the phrase dictionary in the phrase database;
  a phrase classification unit that, for each type of the rock properties, classifies the extracted phrases into a plurality of probabilities of the labeled phrases over the plurality of depth intervals;
  a numerical generation unit that, for each type of the rock properties, transforms the probabilities of the labeled phrases for the extracted phrases over the plurality of depth intervals into a numerical vector or a numerical scalar; and an output unit that receives a selection of one of the rock properties, and displays a bird's eye viewpoint of the numerical vector or numerical scalar of the selected rock property of the drilled borehole in relation with different numerical vectors or numerical scalars of other individual wellbores stored in the wellbore database, wherein the phrase classification unit is trained to classify the extracted phrases in to the plurality of probabilities of labeled phrases using the labeled phrases stored in the database, and wherein the numerical generation unit uses a trained hidden Markov model to transform the probabilities of the labeled phrases into the numerical vector or numerical scalar.

2. The system according to claim 1,
wherein the text information of the geology report is in a natural language form.

3. The system according to claim 1,
wherein the geology report is in an image format, and the phrase extraction unit performs optical character recognition on the geology report to extract the depth intervals and the text information of the rock properties from the geology report.

4. The system according to claim 1,
wherein the numerical generation unit transforms the probabilities, which are frequencies, of the labeled phrases for the extracted phrases over the plurality of depth intervals into the numerical scalar or the numerical vector.

5. The system according to claim 1,
wherein the numerical generation unit calculates a plurality of transition frequencies among the labeled phrases and serializes the transition frequencies into the numerical vector or the numerical scalar.

6. The system according to claim 1,
wherein the numerical generation unit converts the probabilities of the labeled phrases describing the rock properties over the plurality of depth intervals into the numerical vector or the numerical scalar based on changes of the probabilities of the labeled phrases over the plurality of depth intervals.

7. The system according to claim 1,
wherein the numerical generation unit converts the probabilities of the labeled phrases over the plurality of depth intervals into the numerical vector or the numerical scalar based on physical information of the wellbores in the wellbore database.

8. The system according to claim 7,
wherein the physical information of the wellbores includes wellbore shape, and the transformation of the probabilities of the labeled phrases is performed over the depth intervals along a horizontal section of the drilled borehole.

9. The system according to claim 7,
wherein the physical information of the wellbores includes a plurality of locations of fracturing points, and the transformation of the probabilities of the labeled phrases is performed over the depth intervals near the fracturing points.

10. The system according to claim 7,
wherein the physical information of the wellbores includes a depth-interval measure scale, and the transformation of the probabilities of the labeled phrases is performed according to a ratio of a current depth-interval scale of the drilled borehole to an average depth-interval scale of the wellbores.

11. A method to process a geology report about a subsurface of a well and visualize information describing a plurality of rock samples collected along a drilled borehole of the well, the method comprising:

storing a phrase database for rock properties including a phrase dictionary, a plurality of labeled phrases, and a wellbore database including wellbore information of a plurality of wellbores;

receiving a selection of the geology report from a user interface including text information of a plurality of phrases for rock properties describing the rock samples, which are collected at depth intervals of the drilled borehole;

extracting, for each of the rock properties, a plurality of phrases about the rock properties and a corresponding plurality of depth intervals of the drilled borehole from the geology report based on the phrase dictionary in the phrase database;

classifying, for each of the rock properties, the extracted phrases into a plurality of probabilities of the labeled phrases over the plurality of depth intervals;

transforming, for each of the rock properties, the probabilities of the labeled phrases for the extracted phrases over the plurality of depth intervals into a numerical vector or a numerical scalar; and receiving a selection of one of the rock properties, and displaying a bird's eye viewpoint of the numerical vector or numerical scalar of the selected rock property of the drilled borehole in relation with different numerical vectors or numerical scalars of other individual wellbores stored in the wellbore database, wherein the classification of the extracted phrases in to the plurality of probabilities of labeled phrases uses a classifier that is trained with the labeled phrases stored in the database, and wherein the numerical generation unit uses a trained hidden Markov model to transform the probabilities of the labeled phrases into the numerical vector or numerical scalar.

12. The method according to claim 11,
wherein the text information of the geology report is in a natural language form.

13. The method according to claim 11,
wherein the geology report is in an image format, and the extraction of the phrases includes performing optical character recognition on the geology report to extract the depth intervals and the text information of the rock properties from the geology report.

14. The method according to claim 11,
wherein the probabilities of the labeled phrases are frequencies which are transformed into the numerical scalar or the numerical vector.

15. The method according to claim 11,
wherein the transforming of the probabilities of the labeled phrases includes calculating a plurality of transition frequencies among the labeled phrases and serializing the transition frequencies into the numerical vector or the numerical scalar.

16. The method according to claim 11,
wherein the transforming of the probabilities of the labeled phrases includes converting the probabilities of the labeled phrases describing the rock properties over the plurality of depth intervals into the numerical vector or the numerical scalar based on changes of the probabilities of the labeled phrases over the plurality of depth intervals.

17. The method according to claim 11,
wherein the transforming of the probabilities of the labeled phrases includes converting the probabilities of the labeled phrases over the plurality of depth intervals into the numerical vector or the numerical scalar based on physical information of the wellbores in the wellbore database.

18. The method according to claim 17,
wherein the physical information of the wellbores includes wellbore shape, and the transformation of the probabilities of the labeled phrases is performed over the depth intervals along a horizontal section of the drilled borehole.

19. The method according to claim 17,
wherein the physical information of the wellbores includes a plurality of locations of fracturing points, and the transformation of the probabilities of the labeled phrases is performed over the depth intervals near the fracturing points.

20. The method according to claim 17,
wherein the physical information of the wellbores includes a depth-interval measure scale, and the transformation of the probabilities of the labeled phrases is performed according to a ratio of a current depth-interval scale of the drilled borehole to an average depth-interval scale of the wellbores.

* * * * *